United States Patent
Lee (10) Patent No.: US 9,779,620 B2
(45) Date of Patent: Oct. 3, 2017

(54) METHOD FOR OBTAINING TRAFFIC INFORMATION USING BILLING INFORMATION OF MOBILE TERMINAL

(75) Inventor: Chung-hak Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 3453 days.

(21) Appl. No.: 10/550,942

(22) PCT Filed: Mar. 27, 2004

(86) PCT No.: PCT/KR2004/000705
§ 371 (c)(1),
(2), (4) Date: Nov. 23, 2005

(87) PCT Pub. No.: WO2004/086806
PCT Pub. Date: Oct. 7, 2004

(65) Prior Publication Data
US 2006/0106622 A1 May 18, 2006

(30) Foreign Application Priority Data

Mar. 28, 2003 (KR) .................... 10-2003-0019644
Jun. 10, 2003 (KR) .................... 10-2003-0037190

(51) Int. Cl.
*G08G 1/01* (2006.01)
*G06Q 30/04* (2012.01)
*H04M 15/00* (2006.01)

(52) U.S. Cl.
CPC .......... *G08G 1/0104* (2013.01); *G06Q 30/04* (2013.01); *H04M 15/00* (2013.01)

(58) Field of Classification Search
CPC ...... G08G 1/0104; H04M 15/00; G06Q 30/04
(Continued)

(56) References Cited

U.S. PATENT DOCUMENTS 5,732,383 A * 3/1998 Foladare et al. ............ 455/456.5
6,212,448 B1 * 4/2001 Xydis ............................ 701/23
(Continued)

FOREIGN PATENT DOCUMENTS

JP          10-307993          11/1998
JP          11-103479          4/1999
(Continued)

OTHER PUBLICATIONS

Wei, Cui and Mostafa A. Bassiouni. "Analysis of Hierarchical Cellular Networks with Mobile Base Stations." Wireless Communications & Mobile Computing, vol. 2, No. 2, Mar. 2002, pp. 131-149. EBSCOhost, doi:10.1002/wcm.45.*
(Continued)

*Primary Examiner* — Carrie S Gilkey
(74) *Attorney, Agent, or Firm* — Hauptman Ham, LLP (57) ABSTRACT

The present invention relates to a method for obtaining traffic information using the billing information of a mobile terminal. A specified number of a mobile terminal is obtained from billing information necessary for performing a billing operation when a telephone call is made using the mobile terminal on a highway (S61, S62 and S63). The moving time of the mobile terminal between base stations is tracked (S65), such that information of a traffic state on the highway can be obtained in real time (S66). The existing mobile communication network is employed to obtain the traffic information, such that the cost required for operating special vehicles for collecting traffic information and for obtaining traffic information from information providers can be reduced. Customer demand can be met as a measurement operations is continuously carried out and the traffic information abruptly changed is reflected in real time.

4 Claims, 6 Drawing Sheets

(58) Field of Classification Search
USPC .......................................... 701/117, 118, 119
See application file for complete search history.

(56) References Cited

U.S. PATENT DOCUMENTS

| | | | |
|---|---|---|---|
| 6,490,519 B1* | 12/2002 | Lapidot et al. ............... | 701/117 |
| 6,577,946 B2* | 6/2003 | Myr .............................. | 701/117 |
| 7,408,916 B2* | 8/2008 | Kassinen et al. ............. | 370/350 |
| 2002/0082766 A1 | 6/2002 | Ormson ................... | G08G 1/00 |
| 2003/0014181 A1 | 1/2003 | Myr ......................... | G08G 1/00 |
| 2003/0129994 A1* | 7/2003 | Nagatsuma et al. .......... | 455/456 |

FOREIGN PATENT DOCUMENTS

| | | |
|---|---|---|
| JP | 2001-243513 | 9/2001 |
| JP | 2001-283373 | 10/2001 |
| JP | 2002-117491 | 4/2002 |
| JP | 2002-170138 | 6/2002 |
| KR | 1020000058946 A | 10/2000 |
| KR | 100281049 B1 | 11/2000 |
| WO | 02/43026 | 5/2002 |

OTHER PUBLICATIONS

Japanese Office Action for application No. 2006-507778.

* cited by examiner

METHOD FOR OBTAINING TRAFFIC INFORMATION USING BILLING INFORMATION OF MOBILE TERMINAL

TECHNICAL FIELD

The present invention relates to a method for obtaining traffic information using billing information of a mobile terminal, and more particularly to a method for obtaining traffic information using billing information of a mobile terminal that can obtain a specified number of the mobile terminal from the billing information and track the moving time of a corresponding mobile terminal between base stations when the mobile terminal attempts a telephone call on a highway, such that information on road traffic can be obtained in real time.

BACKGROUND ART

A car navigation system is a high-technology system for receiving position information by identifying a current position of a vehicle and providing various services for providing a route guide, traffic guide, peripheral information, and additional information by combining the position information with geographic information. Furthermore, there has already been commercialized a car navigation system combined with global positioning system (GPS) technologies for vehicles capable of relaying driving directions to a driver through a display screen or voice signal and a vast geographic information system (GIS). This car navigation system is being employed for land and water transport operations as in public transportation system, a delivery trucks, and quick delivery services.

A GPS receiver is mounted in a mobile device such as a personal digital assistant (PDA) or etc. so that a map and current position information of the mobile device are displayed on a screen of the mobile device. The GPS technology for a mobile terminal is applied to provide various information units such as traffic, shopping and café information close to the current position.

A device for telematics, the combination of telecommunication and informatics, is mounted in vehicles, and couples wireless communication technology, GPS technology, GIS technology and call center technology to the vehicles. Moreover, the telematics device provides real-time traffic and living information for drivers, a method for taking action against an emergency situation, remote vehicle diagnosis, car accident prevention, theft prevention, driving route guide, and is coupled to a vehicle on-board controller, an audio system, a display, etc., such that the telematics device is developing into a mobile office concept.

There is a problem in that the vehicles must install high priced telematics devices for supporting the wireless mobile communication, GPS and GIS, in order that the above-described services can be provided.

Thus, when the real-time traffic and living information and driving route information are desired to be provided using mobile phones carried by most drivers, the GPS receiver must be mounted on a hands-free set, and hence the drivers can receive various information units by accessing the Internet through mobile phones after the GPS receiver identifies positions of their vehicles.

Figure 1:
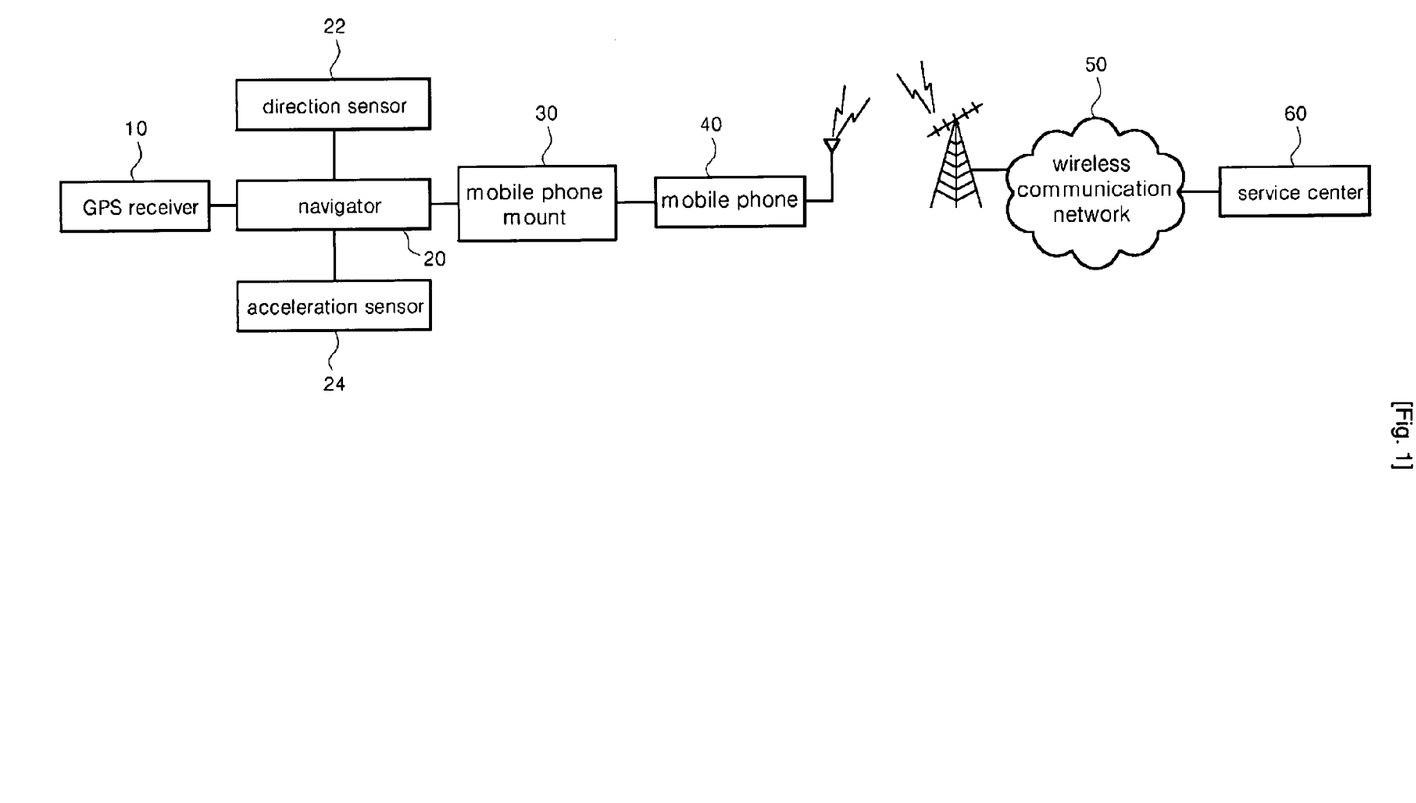
FIG. 1 is a block diagram illustrating the configuration of a navigation system using a conventional mobile phone.

FIG. 1 is a block diagram illustrating the configuration of a navigation system using a conventional mobile phone.

As shown in FIG. 1, the navigation system includes a mobile phone 40 for performing wireless communication through a wireless communication network 50; a service center 60 coupled to the wireless communication network 50 for analyzing real-time traffic information and calculating an optimum route; a GPS receiver 10 for identifying current position information from a satellite; a direction sensor 22; and an acceleration sensor 24. Moreover, the navigation system includes a navigator 20 for storing the position information received from the GPS receiver 10, accessing the service center 60 through the mobile phone 40, controlling a transmission operation for position information and a reception operation for various information units, and outputting a result through the mobile phone 40, and a mobile phone mount 30 on which the mobile phone 40 is mounted. The mobile phone mount 30 supplies power to the mobile phone 40.

In this case, the GPS receiver 10, the navigator 20 and the mobile phone mount 30 are mounted in a vehicle in a hands-free form and are formed so that they can be separated from the mobile phone 40.

Figure 2:
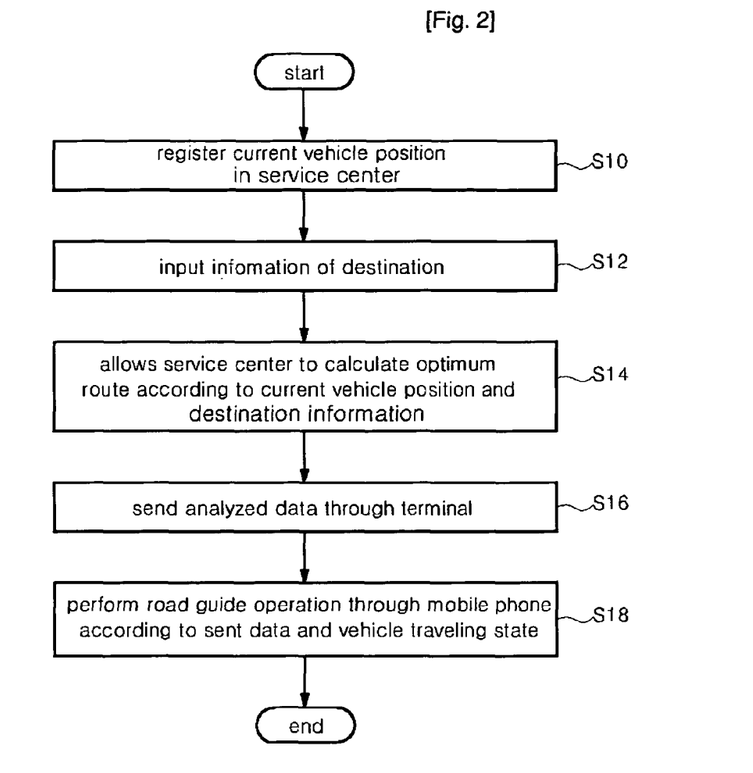
FIG. 2 is a flowchart illustrating a method for operating the navigation system using the conventional mobile phone.

The operation of the navigation system using the conventional mobile phone will be described with reference to a flowchart illustrating a method for operating the navigation system using the conventional mobile phone shown in FIG. 2.

First, the navigation system downloads an operating program from the service center 60 through the wireless communication network 50 using the mobile phone 40, identifies current position information through the GPS receiver 10, and registers the identified position information in the service center 60 (S10).

Then, the navigation system enables a driver to input information of his/her destination (S12). If so, the service center 60 produces traffic information analyzed in real time and an optimum route according to the current vehicle position and the destination (S14).

Then, the service center 60 transmits analyzed data to the mobile phone 40 (S16).

Then, the navigator 20 performs a road guide operation through the mobile phone 40 according to data transmitted through the mobile phone 40 and a vehicle traveling state based on the direction sensor 22 and the acceleration sensor 24 (S18).

In order that the traffic information and road guide service be provided, the road traffic information must be identified and information of the identified road traffic state must be organized in a database of the service center 60. Traffic information services are being provided using information units acquired by a method for collecting traffic information through closed circuit televisions (CCTVs) installed on major roads by the Road & Transportation Builders Association and information providers, a method for collecting traffic information through traffic correspondents, a method for collecting traffic information through loop sensors installed on roads, a method for collecting traffic information using beacons, etc.

There is a problem in the high cost required to operate vehicles for acquiring or collecting the traffic information or to purchase the traffic information from the information providers. Furthermore, there is another problems in that traffic information is not reflected in real time because it is difficult for the traffic information to be continuously measured and hence customer demand cannot be satisfied.

DISCLOSURE

Therefore, the present invention has been made in view of the above problems, and it is an object of the present invention to provide a method for obtaining traffic information using billing information of a mobile terminal that can obtain a unique number of the mobile terminal from the billing information and track a moving time of a corresponding mobile terminal between base stations when the mobile terminal attempts a telephone call on a highway, such that information indicative of a road traffic state can be obtained in real time.

In accordance with one aspect of the present invention, the above and other objects can be accomplished by the provision of a method for obtaining traffic information using billing information of a mobile terminal, comprising the steps of: receiving call data based on a telephone call attempted by the terminal; extracting unique information of the terminal from the received call data; requesting that position information be transmitted at unit-time intervals for a position tracking operation according to the extracted unique information of the terminal; tracking a moving path and time of the terminal between base stations according to the transmitted position information; and producing an average speed per hour between base stations according to the tracked moving path and time.

Preferably, the base stations are installed and managed on a highway.

Preferably, the unique information of the terminal is a terminal identification number.

Preferably, the unit-time intervals for the position tracking operation associated with a position information registration request are maintained as 30-second intervals while taking into account a moving time of a car.

Preferably, the position information is transmitted together with a wakeup signal.

Preferably, a sample object is selectively extracted on a section-by-section basis or in each section when the unique information of the terminal is extracted from the received call data.

Preferably, the section is formed by a group of one to seven base stations, and there is at least one sample object on the section-by-section basis.

Preferably, an operation for tracking a lower-priority sample object is terminated when sample objects are concentrated on the section-by-section basis.

Preferably, the number of sample objects in a corresponding section is increased for a predetermined time, a tracking operation for normally moving sample objects is carried out and a tracking operation for another sample object is terminated, when sample objects are concentrated on the section-by-section basis and an operation for tracking the sample object is terminated at a predetermined number of times.

Preferably, an operation for tracking a lower-priority sample object is carried out and an operation for tracking a first priority sample object is terminated, when sample objects are concentrated on the section-by-section basis due to a difference between distances of sections and a difference between moving speeds of the sample objects.

Preferably, the average speed per hour between the base stations is produced by dividing a distance between the base stations based on the moving path by the moving time.

Preferably, the average speed per hour is estimated as a maximum speed on a highway when no call data is received at the step of receiving the call data.

Preferably, the step of producing the average speed per hour between the base stations comprises the step of: adding a reference time to a unit-time interval for the position tracking operation when a movement between the base stations is not present, and producing a result of the addition.

Preferably, the reference time is 2 minutes.

Preferably, the method further comprises the step of: terminating the tracking operation when a setup operation is carried out between the terminal and a different base station other than the base stations installed and managed on the highway.

Preferably, the tracking operation is terminated when the setup operation is carried out between the terminal and the different base station other than the base stations installed and managed on the highway twice or more.

In accordance with another aspect of the present invention, the above and other objects can be accomplished by the provision of a method for obtaining traffic information using billing information of a mobile terminal, comprising the steps of: receiving call data based on a telephone call attempted by the terminal; extracting unique information of the terminal from the received call data; determining whether handoff data has been generated according to the extracted unique information of the terminal; if the handoff data has been generated, tracking a moving path and time of the terminal between base stations according to a handoff signal; and producing an average rate of speed between the base stations according to the tracked moving path and time.

Preferably, the base stations are installed and managed on a highway.

Preferably, the method further comprises the step of: terminating the tracking when the terminal terminates the telephone call.

Preferably, the method further comprises the step of: if the handoff data has not been generated, terminating the tracking.

Preferably, the unique information of the terminal is a terminal identification number.

Preferably, the average rate of speed between the base stations is produced by dividing a distance between the base stations based on the moving path by the moving time.

Preferably, the method further comprises the step of: when a setup operation is carried out between the terminal and a different base station other than the base stations installed and managed on the highway, terminating the tracking.

Preferably, the tracking is terminated when the setup operation is carried out between the terminal and the different base station other than the base stations installed and managed on the highway twice or more.

Preferably, the step of producing the average rate of speed between the base stations comprises the step of: grouping two to seven base stations and producing the average speed in a predetermined section.

In accordance with yet another aspect of the present invention, the above and other objects can be accomplished by the provision of a method for obtaining traffic information using billing information, comprising the steps of: setting a reference value of a traffic state according to the number of generated telephone calls associated with a corresponding base station on a time zone-by-zone basis; extracting telephone calls associated with the base station at predetermined time intervals; comparing the number of the extracted telephone calls with the reference value; and setting a traffic class of a corresponding base station area according to an increase or decrease based on a result of the comparison.

Preferably, the base station installed and managed on a highway has one sector dedicatedly assigned for the highway, and the predetermined time intervals are 5-minute intervals.

In accordance with the present invention, when a terminal attempts a telephone call on a highway, call data necessary for performing a billing operation is extracted from unique information of the terminal and then position information is sent at predetermined time intervals according to the unique information of the terminal, such that a moving speed of a car is produced and hence a traffic state of the highway can be identified in real time. Alternatively, a moving path and time are calculated according to a handoff signal between base stations while telephone communication is performed, such that the moving speed of the car is produced, and a traffic class of a corresponding area can be decided in real time according to the number of attempted telephone calls on a time zone-by-zone basis in relation to a corresponding base station.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the annexed drawings. The preferred embodiments are not intended to limit the scope of the present invention. In the drawings, the same or similar elements are denoted by the same reference numerals even though they are depicted in different drawings.

Figure 3:
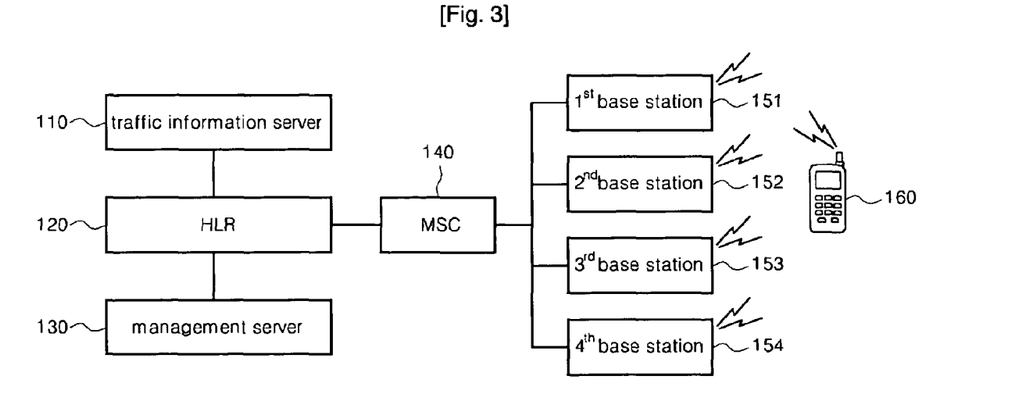
FIG. 3 is a block diagram illustrating the configuration of a system to which a method for obtaining traffic information using billing information of a mobile terminal is applied in accordance with the present invention.

FIG. 3 is a block diagram illustrating the configuration of a system to which a method for obtaining traffic information using billing information of a mobile terminal is applied in accordance with the present invention.

As shown in FIG. 3, the system includes first to fourth base stations 151 to 154 installed on a highway and a highway tollgate for communicating with at least one terminal 160 moving on the highway through a wireless interface zone; a mobile switching center (MSC) 140 coupled to the first and fourth base stations 151 to 154 for performing a switching function associated with the terminal 160; a home location register (HLR) 120 coupled to the MSC 140 for storing a mobile identification number (MIN) of the terminal 160, subscriber information and position information; a management server 130 for making a position information registration request based on the MIN through the HLR 120 and processing a handoff; and a traffic information server 110 for tracking a moving path and time of the terminal 160 between the base stations or acquiring traffic information according to an attempted call.

All components except for the traffic information server 110 are the same as those of the conventional mobile communication network. The system in accordance with the present invention further uses the traffic information server 110 for acquiring the traffic information.

Figure 4:
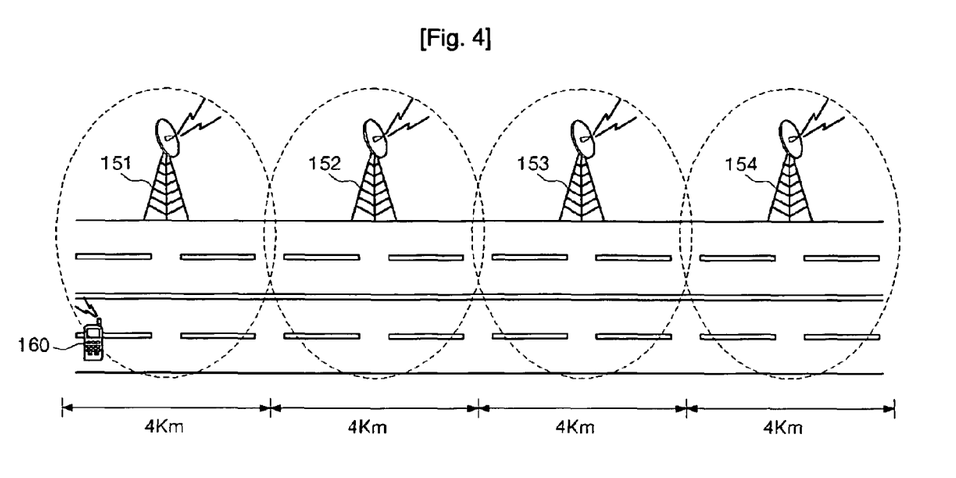
FIG. 4 is an explanatory view illustrating an arrangement of installed base stations necessary for explaining the method for obtaining traffic information using billing information of the mobile terminal in accordance with the present invention.

Furthermore, FIG. 4 is an explanatory view illustrating an arrangement of installed base stations necessary for explaining the method for obtaining traffic information using billing information of the mobile terminal in accordance with the present invention.

As shown in FIG. 4, a highway is shown, and the first to fourth base stations 151 to 154 are installed adjacent to one another on the highway. The following description will be given of a method for acquiring traffic information in a state in which a user holding the mobile terminal 160 rides in a car, and moves along the highway.

As the car does not need to be monitored in all directions because it moves in one direction in case of the first to fourth base stations 151 to 154 installed on the highway, the base stations are arranged side by side so that one of three base station sectors can be assigned to the highway in hardware.

Figure 5:
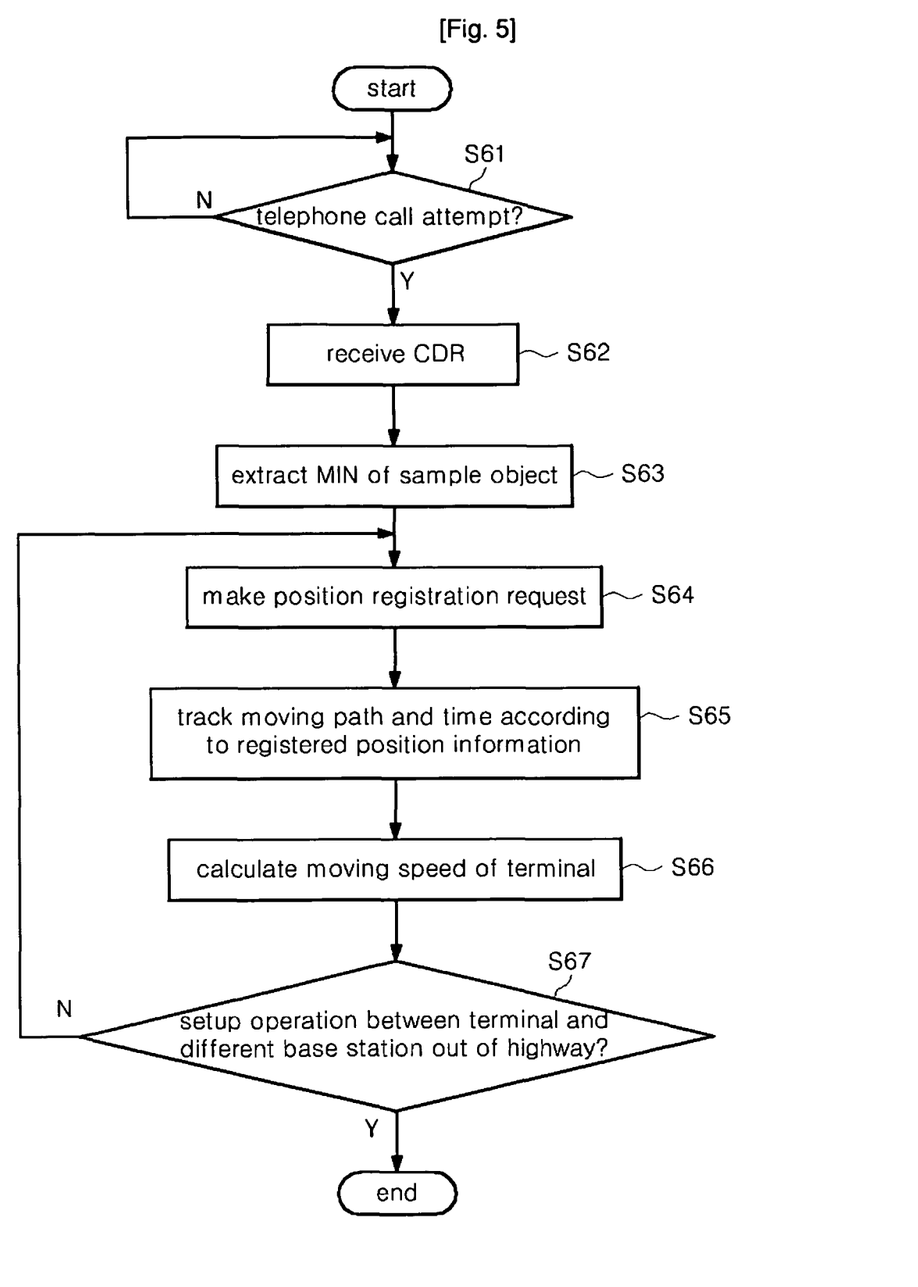
FIG. 5 is a flowchart illustrating the method for obtaining traffic information using billing information of the mobile terminal in accordance with one embodiment of the present invention.

FIG. 5 is a flowchart illustrating the method for obtaining traffic information using billing information of the mobile terminal in accordance with another embodiment of the present invention.

First, a determination is made as to whether the user has attempted a telephone call while a car in which the user holding the mobile terminal 160 rides enters the highway tollgate (S61).

If the user has attempted the telephone call, the terminal 160 sends a call data record (CDR) containing its own mobile identification number (MIN) for call access and billing, an access time, a telephone number of an opposite party, etc. to the MSC 140 through the first base station 151. At this point, the MSC 140 receives the CDR and registers position information of the terminal 160 in the HLR 120 (S62).

When the telephone call is attempted, the system extracts the MIN from the position information of a corresponding terminal 160 registered in the HLR 120 (S63).

The system tracks a corresponding mobile terminal 160 by extracting a corresponding MIN through the position information acquired when the telephone call is attempted (S65).

Typically, an average moving speed between the base stations can be produced from a moving path and time of the terminal 160 between the base stations through the position information of the terminal 160 registered in the HLR 120.

The HLR 120 registers the position information of the terminal 160 when a telephone call is attempted, the terminal's position information is registered at predetermined time intervals or the terminal 160 moves to a communication zone.

However, because one MSC manages a plurality of base stations installed within a wide area and position information inputted from the managed base stations is registered in the HLR, the HLR receives the position information of the terminal at approximately one-hour intervals and registers the received position information where the terminal does not attempt the telephone call. Thus, there is a problem in that the system cannot correctly identify how the terminal has moved or a moving path within the wide area because the position information has been registered in the HLR one hour prior.

Where the telephone call is attempted as in the embodiment of the present invention described above, the system can determine whether the car carrying the terminal 160 is entering the highway, in real time through the CDR necessary for performing a billing operation and the registered position information of the terminal 160, such that it can track or identify a moving path and time using the MIN of the terminal 160 on the basis of a result of the determination.

At this point, where the MSC 140 makes a request necessary to register position information units associated with a plurality of terminals 160, a switching function can have a problem because of overload on the MSC 140. A minimum of one base station to a maximum of seven base stations are set as one section, and the number of terminals 160 serving as sample objects to be tracked is constantly set. As the number of sample objects does not exceed the set number, a load on the MSC 140 can be reduced.

The number of sample objects can be set to '1' so that the load of the MSC 140 can be reduced. That is, where the number of sample objects is increased due to traffic congestion in a state in which a position tracking operation is being performed, the system terminates a position tracking operation for sample objects having lower priorities other than the sample object having the first priority that is currently tracked, and maintains the position tracking operation for one sample object, such that the system can reduce the load of the MSC 140.

Although the car carrying any other terminal 160 enters the highway tollgate and any other terminal 160 attempts a telephone call, any other terminal 160 is not extracted as a sample object to be tracked where the tracking operation is currently carried out for a corresponding section.

However, where a plurality of sample objects enter the same section due to a difference between distances of sections and a difference between moving speeds of the sample objects, correct data is extracted through the position tracking operation for a normally moving sample object, as the position tracking operation for a lower-priority sample object is carried out and the position tracking operation for the first-priority sample object is terminated.

On the other hand, where sample objects are concentrated in a specific section such as a resting place, and the position tracking operation for the lower-priority sample objects is terminated twice or more so that the position tracking operation for one sample object can be maintained, 5 sample objects are additionally and temporarily extracted for 5 minutes in this embodiment. When more than 50% of the additionally extracted sample objects moves to the next section normally, the position tracking operation for the remaining sample objects other than one of the sample objects is terminated, such that an error in the moving time between the base stations can be compensated when a road traffic state is normal but the sample object is stopped in the resting place or etc.

On the other hand, where the sample object being currently tracked comes out of the tollgate, the system extracts an MIN of a corresponding terminal and performs the position tracking operation for the corresponding terminal when position information based on a telephone call attempt destined for the base station performed by the sample object entering the tollgate is registered.

When the number of sample objects in a predetermined section is smaller than the predetermined number of sample objects, the system extracts an MIN of a corresponding terminal attempting a telephone call for the nearest base station and performs the position tracking operation for the corresponding terminal according to a result of the extraction.

However, because the possibility of traffic delay or congestion is not present where the number of vehicles entering the highway near dawn is very small and it is difficult for a new sample object to be extracted, the speed of a vehicle on the highway can be easily estimated as the maximum speed at the time of producing a moving speed.

In a state in which an MIN of a sample object is extracted, the system commands the terminal 160, tracked on the basis of the MIN at constant time intervals, to register position information (S64).

A unit-time interval for the position tracking operation associated with the position information registration request is set so that load of the MSC 140 can be reduced and simultaneously a correct speed can be produced at the time of performing the position tracking operation. In this embodiment, the unit-time interval for the position tracking operation is set to 30 seconds, and the system commands the tracked terminal 160 to register the position information at 30-second intervals.

Thus, the terminal 160 receiving the position information registration command performs a position information registration operation and registers its current position information in the HLR 120.

When the position information registration operation is carried out, the terminal 160 transmits a wakeup signal based on a slot cycle index together with the position information to register the position information, such that the terminal 160 prevents its battery from being additionally depleted.

According to the position information registered in response to the compulsory position information registration command based on the MIN transmitted at the 30-second intervals, the moving path and time of the terminal 160 roving on the highway can be tracked (S65).

According to the continuously inputted position information, the roving time of the terminal between the base stations can be identified in real time, and hence the roving speed of the terminal between the base stations can be produced at a current time (S66).

When the first base station 151 is installed on the highway tollgate and the moving speed is produced, the position information registration based on the telephone call attempt can be present in the first base station 151 and subsequently the position information registration can be present in the second base station 152. At this point, because it cannot be determined whether the position information registration has been performed in some area of radio wave areas, the system roves to the second base station 152 to perform the first setup operation and produces the roving speed in a section of the second base station 152 for a predetermined time period until the setup operation is performed in the third base station 153 subsequent to the second base station 152.

As the loss of time is considered due to an overlap between radio waves from the base stations, the roving speed can be calculated by subtracting 50 seconds from the moving time between the base stations.

For example, a time period between the first setup operation of the second base station 152 and the first setup operation of the third base station 153 is 2 minutes. Where a section of the second base station 152 corresponds to 4 Km, it can be found that the vehicle is driven at a speed of 120 Km/h.

Although a speed of the specific sample object is high due to an overspeed, traffic information is compensated through an average value production operation because speed information is provided as an average value.

Where the moving time of a current sample object is reduced by 30% as compared with the moving time of a previous sample object in a specific section, that is, a section in which a dedicated lane highway system is executed, the current sample object is considered as a sample object going through a bus dedicated lane, and is excluded from the speed production operation, such that the speed production operation is carried out using previous data.

Furthermore, where the movement of sample objects due to congestion in a specific section is almost not present and the sample objects are concentrated in a specific section, it is determined that the moving speed of the vehicle will be reduced due to the traffic congestion after a moving time of 2 minutes when the vehicle is driven a distance of 3 Km at the moving speed of 100 Km/h because an average distance between the base stations is 3 km. After the above-described 2 minutes, the system estimates the moving time of a sample object by adding a time of 30 seconds corresponding to a unit-time interval for the position tracking operation to a reference time of 2 minutes.

A setup operation associated with a different base station other than the first to fourth base stations 151 to 154 can be achieved while the position tracking operation is performed through the first to fourth base stations 151 to 154 installed and managed on the highway. At this point, where the setup operation is temporarily achieved once due to an environment of radio waves, the system does not terminate the position tracking operation while taking into account a temporary state. A speed production operation is appropriately set up. However, where a setup operation associated with a different base station other than the first to fourth base stations 151 to 154 is achieved twice or more, the system determines that a corresponding terminal 160 is off the highway and terminates the position tracking operation for the terminal 160 (S67).

Of course, where the terminal 160 is in a power-down state, the position tracking operation is also terminated.

Where the position tracking operation is terminated as described above, the position tracking operation is resumed on the basis of the MIN of a new sample object attempting a telephone call in relation to a base station next to the currently terminated base station. Alternatively, where the sample object comes out of the highway tollgate and the position tracking operation is terminated, a new sample object is extracted and the position tracking operation for the extracted sample object is performed when a terminal entering the tollgate attempts a telephone call.

Figure 6:
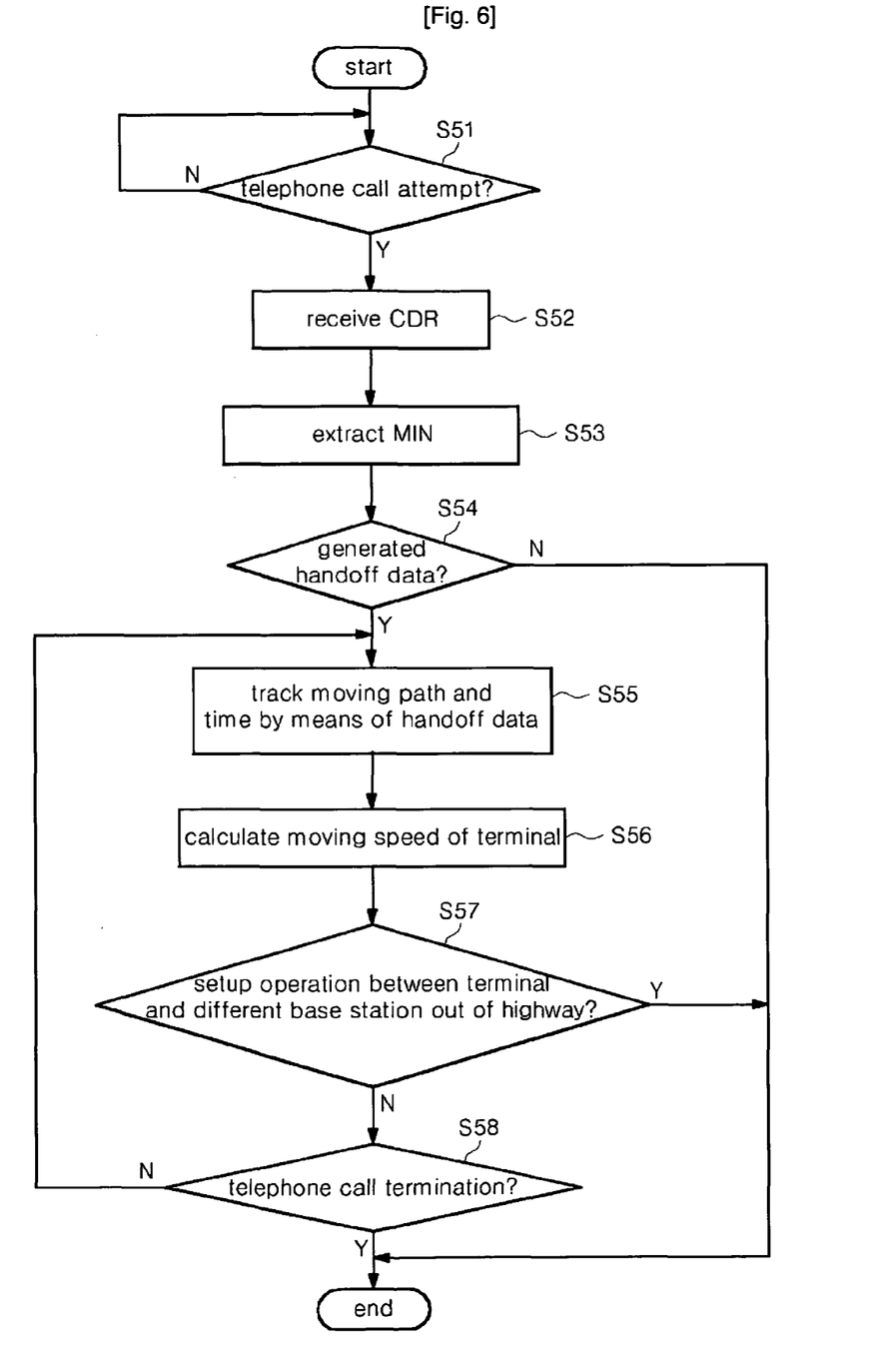
FIG. 6 is a flowchart illustrating the method for obtaining traffic information using billing information of the mobile terminal in accordance with another embodiment of the present invention.

FIG. 6 is a flowchart illustrating the method for obtaining traffic information using billing information of the mobile terminal in accordance with another embodiment of the present invention.

First, a determination is made as to whether the user has attempted a telephone call while a car in which the user holding the mobile terminal 160 rides enters the highway tollgate (S51).

If the user has attempted the telephone call, the terminal 160 sends a call data record (CDR) containing its own mobile identification number (MIN) for call access and billing, an access time, a telephone number of an opposite party, etc. to the MSC 140 through the first base station 151.

At this point, the MSC 140 receives the CDR and registers position information of the terminal 160 in the HLR 120 (S52).

When the position information of the terminal 160 is registered in the HLR 120, the system extracts the MIN of the terminal 160 registered in the HLR 120 (S53). Where an intensity of a radio wave from the second base station 152 is weak when a corresponding terminal 160 moves to another base station while communicating with the second base station 152, it is determined whether handoff data has been generated in order for the terminal 160 to move to the next, third, base station 153 (S54).

If the handoff data has been generated, a moving path and time of the terminal 160 are tracked through the handoff data generated until the telephone call is terminated while the corresponding terminal 160 is tracked (S55 and S58).

That is, the system can identify an active time, a drop time, etc. associated with the second base station 152 through the handoff data generated when the terminal 160 moves from the second base station 152 to the third base station 153.

Where distances between the first base station 151, the second base station 152 and the third base station 153 are known, the system can produce a moving speed of the terminal 160 though a time period between a time point of entering an area of the second base station 152 and a time point of coming out of the area of the second base station 152 (S56).

That is, when it is assumed that a distance in which a handoff in the second base station 152 can occur is 4 Km, a time period between an active time and a drop time in the area of the second base station 152 can be 2 minutes and 24 seconds. At this point, it can be found that the vehicle carrying the terminal 160 is driven at a speed of 100 km/h.

However, the system cannot correctly identify that an active operation has been carried out in which point of the area of the second base station 152 where the user starts a telephone call in the first base station 151 and moves to the second base station 152. Thus, a speed cannot be produced from the handoff data associated with the first base station 151. Where a communication time of the user is long and the terminal 160 goes through the area of the second base station 152, the speed can be produced through the handoff data associated with the second base station 152.

On the other hand, as no handoff data is generated where the communication time of the user is short after attempting the telephone call, a position tracking operation for the terminal 160 corresponding to an extracted MIN is terminated (S54).

As described above, while the system produces a highway-driving speed based on the handoff data, telephone communication of the terminal 160 is achieved through a setup operation associated with a different base station other than the first to fourth base stations 151 to 154 where the terminal 160 canes out of the highway.

Therefore, the system determines that the corresponding terminal 160 comes out of the highway where a setup operation associated with a different base station other than the first to fourth base stations 151 to 154 installed and managed on the highway is achieved, and terminates an operation for tracking the handoff data of the corresponding terminal (S57). Furthermore, also where the telephone communication is terminated, the tracking operation is terminated (S58).

When the car is driven on the highway and a setup operation is carried out between the corresponding terminal and a different base station close to the highway approximately one time, the tracking operation is not terminated. However, where a setup operation is carried out between the corresponding terminal and a different base station other than other than the first to fourth base stations 151 to 154 installed and managed on the highway twice or more, the tracking operation for the handoff data associated with the corresponding terminal 160 is terminated.

Furthermore, when a moving path and time of the corresponding terminal 160 between the base stations are produced on the basis of the handoff data, the system groups one to seven base stations, and an average speed in a corresponding section is produced from the handoff data generated in the corresponding section. Where handoff data is not generated from a base station because the communication time is short, an average speed is produced from handoff data of the next base station.

That is, where the first to fourth base stations 151 to 154 are grouped as one section, a time period between an active time and a drop time in the area of the second base station 152 is 2 minutes and 24 seconds according to handoff data generated from the second base station 152, and a section of each of the first to fourth base stations 151 to 154 corresponds to 4 Km, it is determined that a moving time is 9 minutes and 36 seconds and an average speed of 100 Km/h is produced when a total distance between the first base station 151 and the fourth base station 154 is 16 Km.

Figure 7:
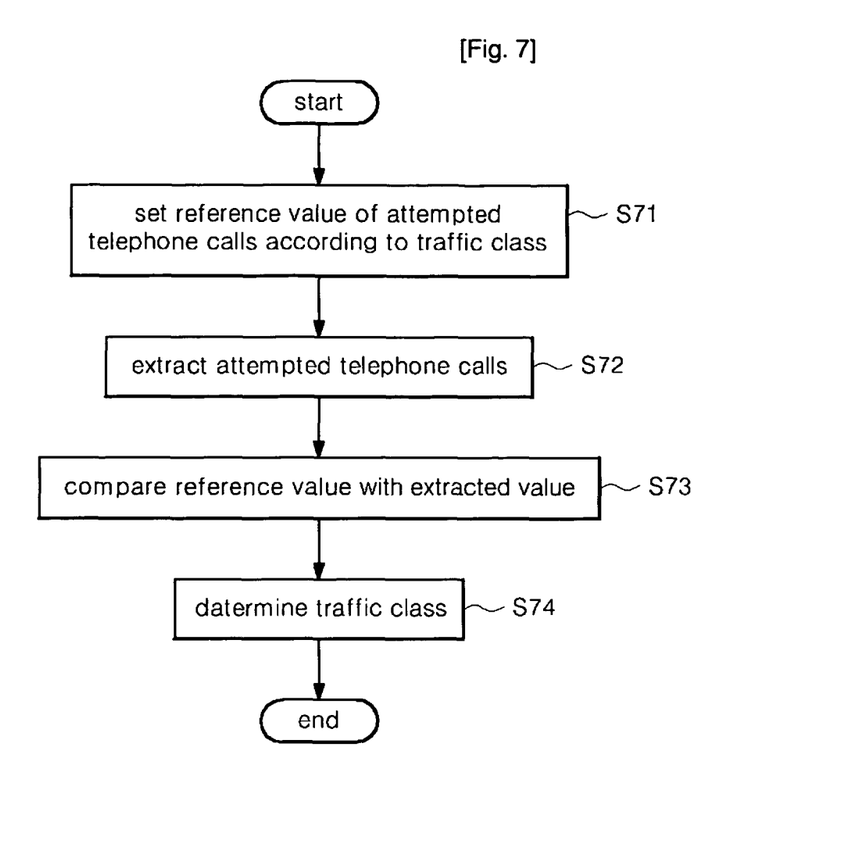
FIG. 7 is a flowchart illustrating the method for obtaining traffic information using billing information of the mobile terminal in accordance with yet another embodiment of the present invention.

FIG. 7 is a flowchart illustrating the method for obtaining traffic information using billing information of the mobile terminal in accordance with yet another embodiment of the present invention.

First, a reference value of a traffic state is set according to the number of attempted calls generated on a time zone-by-zone basis in relation to each of the first to fourth base stations 151 to 154 (S71).

That is, because all terminals of vehicles driven on the highway do not attempt telephone calls, the number of attempted telephone calls is extracted on a date-by-date basis and a time zone-by-zone basis according to a traffic state, and the reference value associated with the traffic state is set.

The number of attempted telephone calls associated with the first to fourth base stations 151 to 154 is extracted at predetermined time intervals (S72). In this embodiment, the number of attempted telephone calls is extracted at 5-minute intervals.

After the number of telephone calls is extracted, the extracted number is compared with the set reference value. According to a result of the comparison, a road traffic state is determined in relation to the areas of the first to fourth base stations 151 to 154 and a traffic class is set (S73 and S74).

For example, a level of 70% of a limit speed indicates a smooth traffic state, a range of 50%~70% indicates a traffic delay state, a range of 20%~50% indicates a traffic congestion state, and a level less than the 20% indicates a serious congestion state. Where an increased percent of attempted telephone calls in the first base station 151 is 20% higher than the reference value, the traffic state indicates the smooth traffic state. Where the increased percent is 20%~50% higher than the reference value, the traffic state indicates the traffic delay state. Where the increased percent is 50%~70% higher than the reference value, the traffic state indicates the traffic congestion state. Furthermore, where the increased percent is 100% higher than the reference value, the traffic state indicates the serious traffic congestion state.

That is, where the increased percent of attempted telephone calls associated with the first base station 151 is 20% higher than the reference value and the increased percent of attempted telephone calls associated with the second base station 152 is 20% higher than the reference value, a traffic class of a section between the first and second base stations is decided to be the smooth traffic state.

INDUSTRIAL APPLICABILITY

As apparent from the above description, the present invention obtains a unique number of a mobile terminal from billing information necessary for performing a billing operation when a telephone call is made using the mobile terminal on a highway and tracks a moving time of the mobile terminal between base stations, such that information of a traffic state of the highway can be obtained in real time.

Furthermore, the present invention employs the existing mobile communication network to obtain traffic information, such that cost required for operating special vehicles for collecting traffic information and for obtaining traffic information from information providers can be reduced. In addition, the present invention can meet customer demand by continuously performing a measurement operation and reflecting the traffic information constantly changing in real time.

The invention claimed is:

1. A method for obtaining traffic information, the method performed by a system including a plurality of base stations arranged along a highway, at least one mobile terminal, a mobile switching center (MSC), a home location register (HLR), and a traffic information server, the method comprising the steps of:

receiving call data, by the MSC and via one of the base stations, from a mobile terminal when a user of the mobile terminal attempts a telephone call while riding in a car that moves along the highway;

extracting, by the HLR, terminal information from the received call data;

requesting, by the MSC, position information be periodically transmitted at a predetermined unit-time interval by the mobile terminal during a position tracking operation for the terminal according to the extracted terminal information;

periodically transmitting, by the mobile terminal and in response to the requesting by the MSC, the position information of the mobile terminal at the predetermined unit-time interval;

tracking, by the traffic information server, a moving path and time of the terminal between the base stations according to the transmitted position information; and producing an average speed of the mobile terminal between the base stations according to the tracked moving path and time, wherein a predetermined number of sample objects are selectively extracted on a section-by-section basis or in each section when the terminal information is extracted from the received call data, wherein an operation for tracking a lower-priority sample object is terminated when sample objects are concentrated on the section-by-section basis, and wherein the number of sample objects in a corresponding section is increased for a predetermined time, a tracking operation for normally moving sample objects is carried out and a tracking operation for another sample object is terminated, when sample objects are concentrated on the section-by-section basis and an operation for tracking the sample object is terminated at a predetermined number of times.

2. A method for obtaining traffic information, the method performed by a system including a plurality of base stations arranged along a highway, at least one mobile terminal, a mobile switching center (MSC), a home location register (HLR), and a traffic information server, the method comprising the steps of:
- receiving call data, by the MSC and via one of the base stations, from a mobile terminal when a user of the mobile terminal attempts a telephone call while riding in a car that moves along the highway;
- extracting, by the HLR, terminal information from the received call data;
- requesting, by the MSC, position information be periodically transmitted at a predetermined unit-time interval by the mobile terminal during a position tracking operation for the terminal according to the extracted terminal information;
- periodically transmitting, by the mobile terminal and in response to the requesting by the MSC, the position information of the mobile terminal at the predetermined unit-time interval;
- tracking, by the traffic information server, a moving path and time of the terminal between the base stations according to the transmitted position information; and
- producing an average speed of the mobile terminal between the base stations according to the tracked moving path and time,
- wherein a predetermined number of sample objects are selectively extracted on a section-by-section basis or in each section when the terminal information is extracted from the received call data, and
- wherein an operation for tracking a lower-priority sample object is carried out and an operation for tracking a first priority sample object is terminated, when sample objects are concentrated on a section-by-section basis due to a difference between distances of sections and a difference between moving speeds of the sample objects.

3. A method for obtaining traffic information, the method performed by a system including a plurality of base stations arranged along a highway, at least one mobile terminal, a mobile switching center (MSC), a home location register (HLR), and a traffic information server, the method comprising the steps of:
- receiving call data, by the MSC and via one of the base stations, from a mobile terminal when a user of the mobile terminal attempts a telephone call while riding in a car that moves along the highway;
- extracting, by the HLR, terminal information from the received call data;
- requesting, by the MSC, position information be periodically transmitted at a predetermined unit-time interval by the mobile terminal during a position tracking operation for the terminal according to the extracted terminal information;
- periodically transmitting, by the mobile terminal and in response to the requesting by the MSC, the position information of the mobile terminal at the predetermined unit-time interval;
- tracking, by the traffic information server, a moving path and time of the terminal between the base stations according to the transmitted position information; and
- producing an average speed of the mobile terminal between the base stations according to the tracked moving path and time,
- wherein the step of producing the average speed per hour between the base stations comprises the step of:
- adding a reference time to the unit-time interval for the position tracking operation when a movement between the base stations is not present, and producing the result of the addition.

4. The method as set forth in claim 3, wherein the reference time is 2 minutes.

* * * * *